US012008793B2

(12) United States Patent
Hu et al.

(10) Patent No.: US 12,008,793 B2
(45) Date of Patent: Jun. 11, 2024

(54) OBJECT BEHAVIOR ANALYSIS METHOD, INFORMATION DISPLAY METHOD, AND ELECTRONIC DEVICE

(71) Applicant: BOE Technology Group Co., Ltd., Beijing (CN)

(72) Inventors: Fengshuo Hu, Beijing (CN); Bingchuan Shi, Beijing (CN); Rui Zheng, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 390 days.

(21) Appl. No.: 17/426,110

(22) PCT Filed: Jan. 12, 2021

(86) PCT No.: PCT/CN2021/071204
§ 371 (c)(1),
(2) Date: Jul. 28, 2021

(87) PCT Pub. No.: WO2021/164464
PCT Pub. Date: Aug. 26, 2021

(65) Prior Publication Data
US 2022/0319234 A1    Oct. 6, 2022

(30) Foreign Application Priority Data
Feb. 17, 2020  (CN) .......................... 202010096745.8

(51) Int. Cl.
*G06T 7/70* (2017.01)
*G06V 10/25* (2022.01)
(Continued)

(52) U.S. Cl.
CPC ............... *G06V 10/25* (2022.01); *G06T 7/70* (2017.01); *G06V 20/40* (2022.01); *G06V 20/52* (2022.01); *G06V 40/20* (2022.01)

(58) Field of Classification Search
CPC ........ G06V 10/25; G06V 20/40; G06V 20/52; G06V 40/20; G06V 40/103; G06T 7/70; G06F 18/241
See application file for complete search history.

(56) References Cited

U.S. PATENT DOCUMENTS

2008/0254947 A1 * 10/2008 Mackay ............. G09B 19/0038
482/13
2018/0339195 A1 * 11/2018 Bernotas ............ A63B 22/0076
(Continued)

FOREIGN PATENT DOCUMENTS

CN    107832708 A    3/2018
CN    110188599 A    8/2019
(Continued)

OTHER PUBLICATIONS

International Search Report for PCT/CN2021/071204 dated Apr. 9, 2021.

*Primary Examiner* — Aaron W Carter
(74) *Attorney, Agent, or Firm* — Ling Wu; Stephen Yang; Ling and Yang Intellectual Property

(57) ABSTRACT

An object behavior analysis method includes: acquiring multiple frames of images to be processed from a video of a target scene; detecting at least one first-type object in any frame of image to be processed, and determining key point information of any first-type object; determining key point merging information of any first-type object in a present image according to key point information of first-type objects in the present image and a reference image group, the present image being any frame of image to be processed during present processing, and the reference image group including at least one frame of image to be processed before the present image; and determining a behavior analysis result of any first-type object in the present image according (Continued)

to the key point merging information of the first-type object in the present image.

17 Claims, 8 Drawing Sheets

(51) Int. Cl.
*G06V 20/40* (2022.01)
*G06V 20/52* (2022.01)
*G06V 40/20* (2022.01)

(56) References Cited

U.S. PATENT DOCUMENTS

| | | | |
|---|---|---|---|
| 2019/0362139 A1* | 11/2019 | Mehl | A61B 5/1118 |
| 2019/0371134 A1* | 12/2019 | Chen | G06V 40/103 |
| 2020/0005544 A1* | 1/2020 | Kim | G06T 13/40 |
| 2020/0089942 A1* | 3/2020 | Man | G06N 20/00 |
| 2021/0134009 A1 | 5/2021 | Zhang et al. | |
| 2021/0271928 A1* | 9/2021 | Eyster | G06T 7/246 |
| 2022/0319234 A1* | 10/2022 | Hu | G06V 40/20 |
| 2023/0069758 A1* | 3/2023 | Rao | A63B 71/0622 |

FOREIGN PATENT DOCUMENTS

| | | |
|---|---|---|
| CN | 110659570 A | 1/2020 |
| CN | 110674785 A | 1/2020 |
| CN | 110675433 A | 1/2020 |

\* cited by examiner

Acquire a video of a target scene and a behavior analysis result corresponding to the video respectively ～ 311

Display the video and the corresponding behavior analysis result on a display interface ～ 312

OBJECT BEHAVIOR ANALYSIS METHOD, INFORMATION DISPLAY METHOD, AND ELECTRONIC DEVICE

CROSS-REFERENCE TO RELATED APPLICATIONS

The present application is a U.S. National Phase Entry of International Application No. PCT/CN2021/071204 having an international filing date of Jan. 12, 2021, which claims priority to Chinese patent application No. 202010096745.8, filed on Feb. 17, 2020 and entitled "Object Behavior Analysis Method, Information Display Method, and Electronic Device". The entire contents of the above-identified applications are hereby incorporated by reference.

TECHNICAL FIELD

The disclosure relates, but is not limited, to the technical field of data processing, and particularly to an object behavior analysis method, an information display method, and an electronic device.

BACKGROUND

At present, for analyzing behavior information of an object, a manual monitoring manner is usually adopted for implementation. However, with the rapid development of sciences and technologies and the constant increase of practical application requirements, an artificial intelligence manner is required to be adopted to analyze behaviors of objects in many practical application scenes.

SUMMARY

The below is a summary of the subject matter described herein in detail. The summary is not intended to limit the scope of protection of the claims.

Embodiments of the disclosure provide an object behavior analysis method, an information display method, and an electronic device.

According to an aspect, the embodiments of the disclosure provide an object behavior analysis method, which includes that: multiple frames of images to be processed are acquired from a video of a target scene; at least one first-type object is detected in any frame of image to be processed, and key point information of any first-type object is determined; key point merging information of any first-type object in a present image is determined according to key point information of the first-type objects in the present image and a reference image group, the present image being any frame of image to be processed during present processing, and the reference image group including at least one frame of image to be processed before the present image; and a behavior analysis result of any first-type object in the present image is determined according to the key point merging information of the first-type object in the present image.

According to another aspect, the embodiments of the disclosure provide an information display method, which includes that: a video of a target scene and a behavior analysis result corresponding to the video are acquired respectively, the behavior analysis result being obtained by the abovementioned object behavior analysis method; and the video and the corresponding behavior analysis result are displayed on a display interface.

According to another aspect, the embodiments of the disclosure provide an electronic device, which includes a memory and a processor. The memory is arranged to store a program instruction, and when the processor executes the program instruction, the steps of the abovementioned object behavior analysis method are implemented.

According to another aspect, the embodiments of the disclosure provide a computer-readable storage medium, which stores a program instruction. When the program instruction is executed by a processor, the abovementioned object behavior analysis method is implemented.

According to the object behavior analysis method provided in the embodiments of the disclosure, target detection and key point detection technologies are combined, and behavior analysis is performed using the key point information detected from the multiple frames of images to be processed, so that real-time behavior analysis is supported, and the accuracy of the behavior analysis result may be improved.

After the drawings and the detailed descriptions are read and understood, the other aspects may be comprehended.

BRIEF DESCRIPTION OF DRAWINGS

The drawings provide an understanding to the technical solution of the disclosure, form a part of the specification, and are adopted to explain, together with the embodiments of the disclosure, the technical solutions of the disclosure and not intended to form limits to the technical solutions of the disclosure.

DETAILED DESCRIPTION

Figure 1:
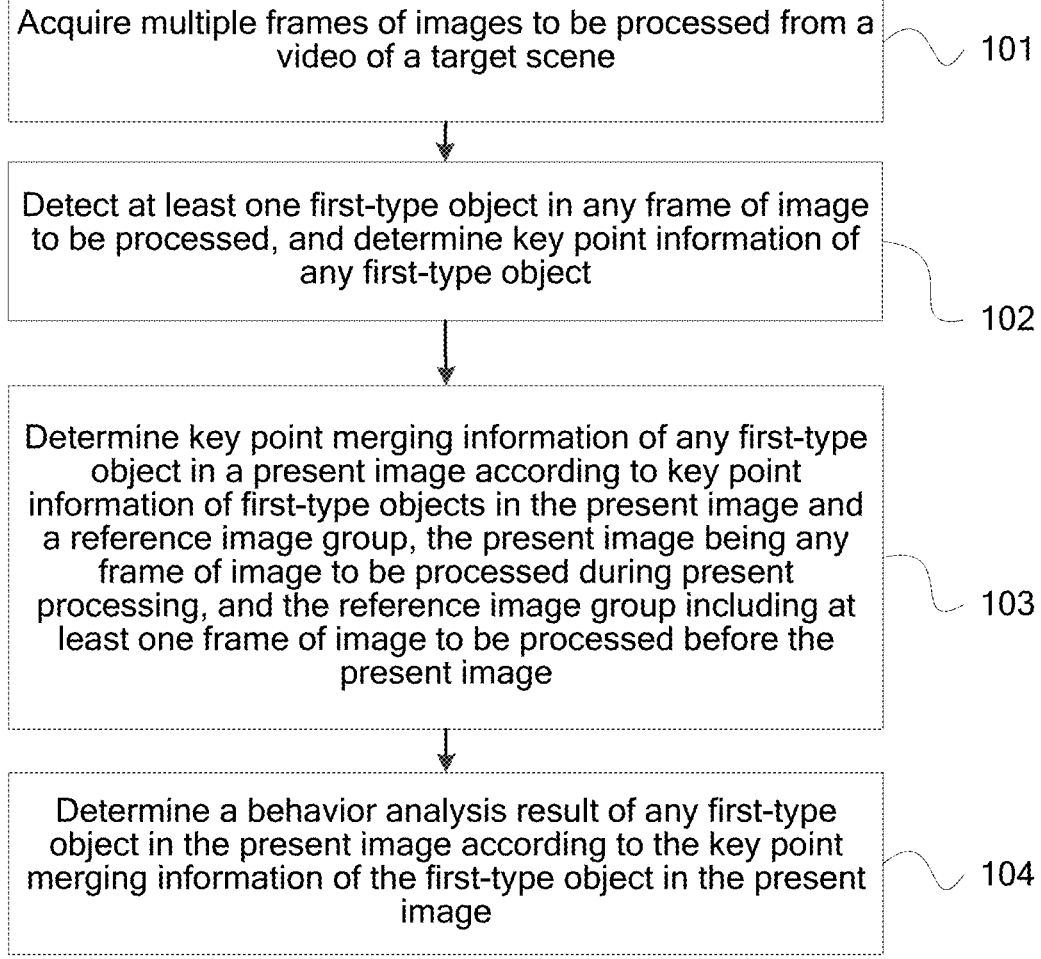
FIG. 1 is a flowchart of an object behavior analysis method according to at least one embodiment of the disclosure.

Multiple embodiments are described in the disclosure. However, the description is exemplary and unrestrictive. Moreover, it is apparent to those of ordinary skill in the art that there may be more embodiments and implementation solutions in the scope of the embodiments described in the disclosure. Although many possible feature combinations are shown in the drawings and discussed in the implementation modes, disclosed features may also be combined in many other manners. Unless specifically restricted, any feature or element of any embodiment may be combined with any other feature or element in any other embodiment for use, or may take the place of any other feature or element in any other embodiment.

The disclosure includes and conceives combinations of features and elements well known to those of ordinary skill in the art. The embodiments, features, and elements that have been disclosed in the disclosure may also be combined with any conventional features or elements to form unique inventive solutions defined by the claims. Any feature or element of any embodiment may also be combined with a feature or element from another inventive solution to form another unique inventive solution defined by the claims. Therefore, it should be understood that any feature shown or discussed in the disclosure may be implemented independently or in any appropriate combination. Therefore, no other limits are made to the embodiments, besides limits made by the appended claims and equivalent replacements thereof. In addition, at least one modification and variation may be made within the scope of protection of the appended claims.

In addition, when a representative embodiment is described, a method or a process may already be presented as a specific step sequence in the specification. However, the method or the process should not be limited to the steps of the specific sequence on the premise that the method or the process is independent of the specific sequence of the steps. As understood by those of ordinary skill in the art, other step sequences are also possible. Therefore, the specific sequence of the steps described in the specification should not be explained as a limit to the claims. Moreover, execution of the steps of the method of the process in the claims for the method or the process should not be limited to the written sequence, and it can be easily understood by those skilled in the art that these sequences may be changed and still fall within the spirit and scope of the embodiments of the disclosure.

Unless otherwise defined, technical terms or scientific terms used in the disclosure have the same meanings as commonly understood by those of ordinary skill in the art to which the disclosure belongs. "First", "second", and similar terms used in the disclosure do not represent any sequence, number, or significance but are only adopted to distinguish different components. In the disclosure, "multiple" represents a number of two or more than two.

For keeping the following description of the embodiments of the disclosure clear and concise, detailed descriptions about part of known functions and known components are omitted in the disclosure. The drawings of the embodiments of the disclosure only involve the structures involved in the embodiments of the disclosure, and the other structures may refer to conventional designs.

The embodiments of the disclosure provide an object behavior analysis method, an information display method, and an electronic device. Target detection and key point detection technologies are combined, and behavior analysis is performed using the key point information detected from the multiple frames of images to be processed, so that real-time behavior analysis may be supported, the behavior analysis accuracy may be improved, and applicability to multiple application scenes is achieved.

FIG. 1 is a flowchart of an object behavior analysis method according to at least one embodiment of the disclosure. As shown in FIG. 1, the object behavior analysis method provided in the embodiment of the disclosure includes the following steps.

In Step 101, multiple frames of images to be processed are acquired from a video of a target scene.

In Step 102, at least one first-type object is detected in any frame of image to be processed, and key point information of any first-type object is determined.

In Step 103, key point merging information of any first-type object in a present image is determined according to key point information of the first-type objects in the present image and a reference image group, the present image being any frame of image to be processed during present processing, and the reference image group including at least one frame of image to be processed before the present image.

In Step 104, a behavior analysis result of any first-type object in the present image is determined according to the key point merging information of the first-type object in the present image.

In the present embodiment, the target scene may be an application scene of the object behavior analysis method provided in the present embodiment. For example, in some examples, the target scene may be a distance category scene, and the object behavior analysis method provided in the present embodiment may be used to analyze a behavior (for example, sitting, bending over a desk, standing, and reading) of a student in the distance category to perform other processing, for example, analyzing a teaching effect, a point of interest, boring point, and difficulty in a course, and an initiative of the student, based on a behavior analysis result of the student. In some other examples, the target scene may be a remote conference scene, and the object behavior analysis method provided in the present embodiment may be used to analyze a behavior (for example, bending over a desk and reading) of a participant in a remote venue to perform other processing, for example, analyzing an initiative of the participant, and a boring point and point of interest in a reference, based on a behavior analysis result of the participant. However, no limits are made thereto in the disclosure. For example, the object behavior analysis method provided in the present embodiment may also be applied to multiple intelligent education scenes such as double-teacher category, electronic white board, and recording analysis.

In the present embodiment, the video of the target scene may be a video shot in real time by an image acquisition device (for example, a camera), or, may be a live video received from another device (for example, a remote server), or may be a recorded video. However, no limits are made thereto in the disclosure.

In the present embodiment, the multiple frames of images to be processed acquired from the video of the target scene in Step 101 may be images required to be automatically processed in the video of the target scene, or, may be images selected by a user and required to be processed. However, no limits are made thereto in the disclosure.

In the present embodiment, the multiple frames of images to be processed acquired from the video of the target scene may be multiple continuous frames of images in the video, or, may be multiple discontinuous frames of images in the video. For example, multiple frames of images may be acquired from the video of the target scene according to a preset time interval as images to be processed, or, each frame of image in the video of the target scene may be used as an image to be processed, or, a frame of image may be selected from the video of the target scene according to an interval of a preset frame number as an image to be processed. However, no limits are made thereto in the disclosure.

In some examples, the multiple frames of images to be processed acquired from the video of the target scene may be sequentially renumbered, for example, recorded as frames 1, 2, . . . , and n, for subsequent processing, and n may be an integer greater than 1. However, no limits are made thereto in the disclosure. For example, the multiple frames of images to be processed acquired from the video of the target scene may not be renumbered, and instead, different images to be processed that are acquired are still distinguished by frame numbers in the video of the target scene.

In the present embodiment, objects in the image to be processed refer to all or part of main bodies, except a background portion, in the image to be processed, i.e., all or part of foreground objects in the image. Herein, a first-type object may be a living object in the image to be processed, for example, a human body or an animal body. A second-type object may be a non-living object in the image to be processed, for example, a desk, a chair, and a building.

In some exemplary implementation modes, the operation that the at least one first-type object is detected in any frame of image to be processed in Step 102 may include that: the at least one first-type object is detected in any frame of image to be processed using a target detection model obtained based on a Yolov3 network. Herein, the Yolov3 network is a convolutional neural network commonly used for deep learning. The Yolov3 network may be trained based on the target scene of the present embodiment to obtain the target detection model applicable to the target scene to detect the first-type object in the target scene. In the present exemplary implementation mode, target detection is performed using the target detection model obtained based on the Yolov3 network, so that a detection speed and accuracy may be improved. However, no limits are made thereto in the disclosure. In another implementation mode, the target detection model applicable to the target scene may be obtained by training based on another algorithm.

In some exemplary implementation modes, the first-type object may be a human body, and key points of the first-type object may include multiple joint points of the human body. Herein, the key point information of the first-type object may include coordinate information (for example, including an abscissa value and ordinate value in a coordinate system defined in the image to be processed) of each joint point of the human body and a corresponding confidence. For example, in the coordinate system defined in the image to be processed, a top left corner of the image is taken as a coordinate origin, a horizontal direction is an abscissa direction, and a vertical direction is an ordinate direction. However, no limits are made thereto in the disclosure. In some examples, the key point information of the first-type object may include coordinate information of 18 joint points corresponding to the human body and corresponding confidences. However, no limits are made thereto in the disclosure.

In some exemplary implementation modes, the operation that the key point information of any first-type object is determined in Step 102 may include that: the key point information of any first-type object is determined using a key point detection model obtained based on a Regional Multi-Person Pose Estimation (RMPE) framework. In the present exemplary embodiment, the key point detection model may adopt a top-down detection manner, and may detect the key point information based on a detection result, obtained by the target detection model, of the first-type object, and the accuracy is relatively high. However, no limits are made thereto in the disclosure. In another implementation mode, the key point detection model may be implemented using another algorithm. For example, key point detection may be performed in a bottom-up detection manner to increase a processing speed, and moreover, when the bottom-up detection manner is adopted, a key point detection process may be independent of the detection result, obtained by the target detection model, of the first-type object.

In some exemplary implementation modes, Step 103 may include that: for the present image and any two adjacent frames of images to be processed in the reference image group, a matching relationship of multiple first-type objects in the two adjacent frames of images to be processed is determined according to key point information of each first-type object in the two adjacent frames of images to be processed; a matching relationship between any first-type object in the present image and at least one first-type object in the reference image group is determined according to the present image and the matching relationship of the multiple first-type objects in any two adjacent frames of images to be processed in the reference image group; and the key point merging information of any first-type object in the present image is determined according to the matching relationship between the first-type object in the present image and the at least one first-type object in the reference image group. In the present exemplary implementation mode, the multiple first-type objects in the multiple frames of images to be processed are matched to obtain the key point merging information of each first-type object in the present image (i.e., the frame of image to be processed during present processing) to support subsequent behavior analysis processing and improve the behavior analysis accuracy.

In the present exemplary implementation mode, when the reference image group includes one frame of image to be processed before the present image, only a matching relationship of multiple first-type objects in the present image and the frame of image to be processed before the present image (i.e., two frames of images to be processed) is required to be determined. When the reference image group includes P frames of images to be processed before the present image, P being an integer greater than 1, a matching relationship of multiple first-type objects in the P+1 frames of images to be processed (i.e., the present image and the P frames of images to be processed before it) is required to be determined. Herein, the matching relationship of the multiple first-type objects in two adjacent frames of images to be processed may be sequentially determined, and then the matching relationship of the multiple first-type objects in the P+1 frames of images to be processed is sequentially obtained by association. In the present exemplary implementation mode, the multiple first-type objects in the present image and the reference image group may be matched to support merging of key point information, thereby improving the behavior analysis accuracy.

In some exemplary implementation modes, the operation that the matching relationship of the multiple first-type objects in the two adjacent frames of images to be processed is determined according to the key point information of each first-type object in the two adjacent frames of images to be processed may include that:

an exponential 2-norm distance between key points of the same category of any first-type object in one frame of image to be processed and any first-type object in the other frame of image to be processed is calculated according to the key point information of each first-type object in the two adjacent frames of images to be processed;

a correlation between the two first-type objects in the two frames of images to be processed is determined according to the number of key points of which exponential 2-norm distances satisfy a third condition; and the matching relationship of the multiple first-type objects in the two frames of images to be processed is determined using a Hungarian algorithm according to the correlation between any two first-type objects in the two frames of images to be processed.

In the present exemplary implementation mode, the third condition may be determined according to a practical scene. For example, the third condition may include that the exponential 2-norm distance is less than or equal to a first threshold. However, no limits are made thereto in the disclosure.

In the present exemplary implementation mode, first-type objects in each frame of image to be processed are taken as a group, exponential 2-norm distances between key points of the same category in two adjacent groups of first-type objects (i.e., the first-type objects in two adjacent frames of images to be processed) are calculated respectively, a correlation between any two first-type objects in the two adjacent frames of images to be processed is determined according to the calculated exponential 2-norm distances, and then matching problems between different first-type objects in the two frames of images to be processed are solved using the Hungarian algorithm to obtain best matching relationship of the first-type objects in the two frames of images to be processed, so that the matching relationship of the multiple first-type objects in the multiple frames of images to be processed may be determined.

In some exemplary implementation modes, the key point information of the first-type object may include coordinate information of multiple key points of the first-type object, and the coordinate information includes coordinate values of two dimensions (for example, the abscissa value and ordinate value in the coordinate system defined in the image to be processed).

Herein, the operation that the exponential 2-norm distance between the key points of the same category of any first-type object in one frame of image to be processed and any first-type object in the other frame of image to be processed is calculated according to the key point information of each first-type object in the two adjacent frames of images to be processed may include that: the exponential 2-norm distance between the key points of the same category of any first-type object in one adjacent frame of image to be processed and any first-type object in the other frame of image to be processed is calculated through the following formula:

$$e^{\frac{-\sum (p_2^i - p_1^i)^2}{(S_1 + S_2) \times (2\sigma)^2}},$$

where $p_1^i$ is a coordinate value in the ith dimension of a key point of a first-type object in one frame of image to be processed, and $p_2^i$ is a coordinate value in the ith dimension of a key point of a first-type object in the other frame of image to be processed, categories of the two key points being the same; and $S_1$ is an area of a detection box of the first-type object in one frame of image to be processed, $S_2$ is an area of a detection box of the first-type object in the other frame of image to be processed, $\sigma$ is a correction coefficient for key points of the category, and i is an integer greater than 0. Herein, the detection box of the first-type object may be a detection box obtained by the target detection model in Step 102. Categories of multiple key points included in the first-type object may be different. For example, the key points of the first-type object include 18 joint points of a human body, and there are 18 categories of key points.

In some exemplary implementation modes, the operation that the key point merging information of any first-type object in the present image is determined according to the matching relationship between the first-type object in the present image and the at least one first-type object in the reference image group and the key point information may include that:

for any key point of any first-type object in the present image, coordinate information of which a confidence corresponding to a category that the key point belongs to is the highest is extracted from key point information of the first-type object in the present image and key point information of a first-type object matched with the first-type object in the reference image group; and key point merging information of the first-type object is obtained according to a highest confidence and coordinate information corresponding to a key point of each category of the first-type object in the present image. Herein, the key point merging information of the first-type object may include the coordinate information corresponding to the key point of each category of the first-type object and a corresponding confidence.

In the present exemplary implementation mode, coordinate information of which a confidence corresponding to each category of key points is the highest is extracted from key point information of a group of matched first-type objects (including multiple first-type objects) to obtain the key point merging information of the first-type objects. For example, if the key point information of the first-type object includes the coordinate information of the 18 joint points of the human body and the corresponding confidences, the key point merging information of the first-type object also includes the coordinate information of the 18 joint points of the human body and the corresponding confidences. Herein, the coordinate information of each joint point is coordinate information corresponding to a highest confidence in the group of matched first-type objects.

In some exemplary implementation modes, Step 104 may include that: when the number of key points of which confidences satisfy a first condition in the key point merging information of any first-type object in the present image satisfies a second condition, the behavior analysis result of the first-type object is determined according to the key point merging information of the first-type object and a first preset position rule. Herein, the first condition, the second condition, and the first preset position rule may be determined according to the practical scene. However, no limits are made thereto in the disclosure.

In some exemplary implementation modes, the object behavior analysis method provided in the present embodiment may further include that: at least one second-type object is detected in any frame of image to be processed, and position information of any second-type object is determined; and the behavior analysis result of any first-type object in the present image is determined according to the key point merging information of the first type-object and position information of the at least one second-type object in the present image. In an example, the second-type object may be detected from the image to be processed using the target detection model obtained based on the Yolov3 network. However, no limits are made thereto in the disclosure.

In the present exemplary implementation mode, the position information of the second-type object in the image to be processed may assist in performing behavior analysis on the first-type object to improve the behavior analysis accuracy.

In some exemplary implementation modes, the operation that the behavior analysis result of any first-type object in the present image is determined according to the key point merging information of the first-type object and the position information of the at least one second-type object in the present image may include that:

when the number of key points of which confidences satisfy the first condition in the key point merging information of any first-type object in the present image satisfies the second condition, the behavior analysis result of the first-type object is determined according to the key point merging information of the first type, the position information of the second-type object in the present image, and a second preset position rule. Herein, the first condition, the second condition, and the second preset position rule may be determined according to the practical scene. However, no limits are made thereto in the disclosure.

In some exemplary implementation modes, after Step 104, the object behavior analysis method of the present embodiment may further include that: behavior analysis results of all first-type objects in the present image are statistically analyzed to obtain a behavior analysis result of the target scene, the behavior analysis result of the target scene including at least one of: the total number of first-type objects of each type of behaviors in the target scene and a ratio of the total number of the first-type objects of each type of behaviors to the total number of first-type objects in the target scene. Herein, when a frame of image to be processed includes multiple first-type objects, after a behavior analysis result of each first-type object is obtained, the behavior analysis results of all the first-type objects in the frame of image to be processed may be statistically analyzed, and a statistical analysis result is determined as the behavior analysis result of the target scene to provide analytical data for subsequent other processing.

The solution of the embodiment of the disclosure will be described below in detail through an example.

Figure 2:
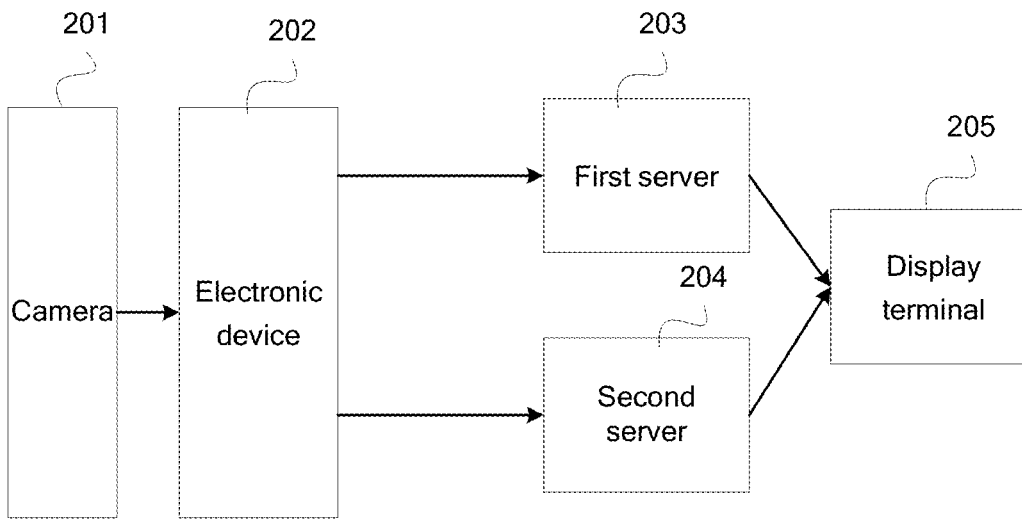
FIG. 2 is an example diagram of an implementation architecture of an object behavior analysis method according to at least one embodiment of the disclosure.

FIG. 2 is an example diagram of an implementation architecture of an object behavior analysis method according to at least one embodiment of the disclosure. As shown in FIG. 2, in the present example, the target scene is a distance category scene, and the object behavior analysis method provided in the present embodiment is used to analyze a behavior of a student in a distance category to perform other processing, for example, evaluating listening and knowledge comprehension conditions of the student and evaluating a teaching condition of a teacher, based on a behavior analysis result of the student.

In the present example, a camera 201 is arranged to shoot a real-time video of the category scene and transmit the acquired video to an electronic device 202. The electronic device 202 is arranged to perform object behavior analysis using the object behavior analysis method provided in the present embodiment. The electronic device 202 divides the video acquired by the camera 201 into two paths. For one path of video, open-source program ffmpeg may generate and push a real-time video stream to a first server 203 (for example, a Real Time Messaging Protocol (RTMP) server), and the first server 203 provides a real-time video for a display terminal 205 such that a real-time category condition may be displayed on a visual interface of the display terminal 205. For the other path of video, the electronic device 205 may perform data extraction and analysis on this path of video using the object behavior analysis method provided in the present embodiment to obtain a behavior analysis result of a single student and behavior analysis results of multiple students in the category for transmission to a second server (for example, a Hyper Text Transfer Protocol (HTTP) server) by request.post in a heartbeat form. For example, data is transmitted once every second. The second server 204 may provide the behavior analysis result for the display terminal 205 such that the display terminal 205 may display the real-time behavior analysis result at the same time of displaying the real-time video to help the teacher to know about the distance category condition. For example, the display terminal 205 may display the behavior analysis result through at least one of manner of an image and a table.

The electronic device 202 shown in FIG. 2 may implement the object behavior analysis method provided in the present embodiment on Openvino of Intel. However, no limits are made thereto in the disclosure. The object behavior analysis method provided in the present embodiment may be implemented in another type of computing terminal or a cloud server.

Figure 3:
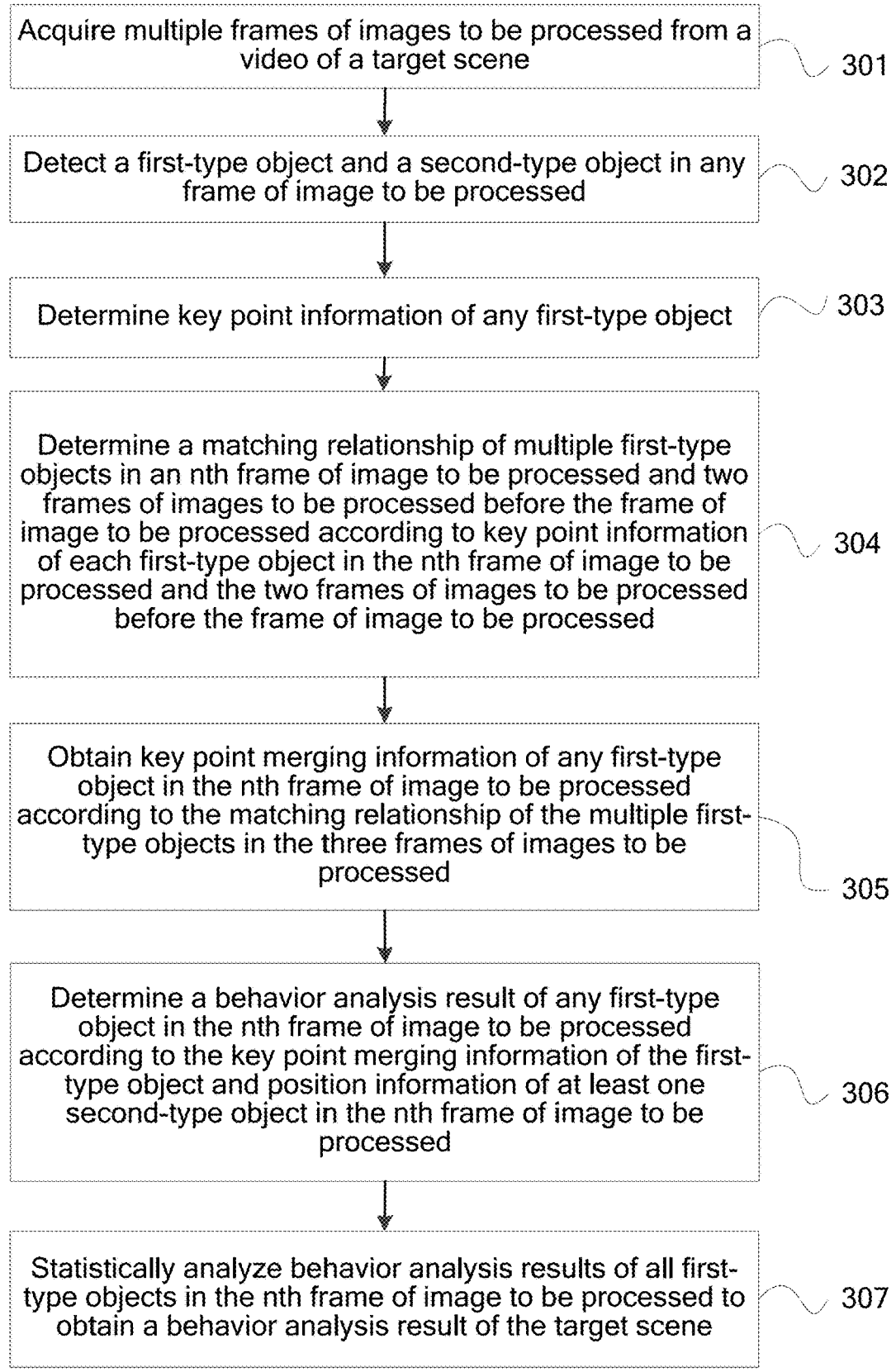
FIG. 3 is an example flowchart of an object behavior analysis method according to at least one embodiment of the disclosure.

FIG. 3 is an example flowchart of an object behavior analysis method according to at least one embodiment of the disclosure. In the present example, the target scene is a distance category scene, and objects in any frame of image to be processed in the video of the target scene may be divided into human bodies and non-human body objects. Herein, the first-type object is a human body, and one or more objects for assisting in performing behavior analysis on the human body in the non-human body objects may be specified as second-type objects. In the present example, the second-type object includes a desk, a book, and a pen. However, no limits are made thereto in the disclosure.

As shown in FIG. 3, the object behavior analysis method provided in the present embodiment includes Step 301 to Step 307.

In Step 301, multiple frames of images to be processed are acquired from a video of a target scene. Herein, the multiple frames of images to be processed are multiple discontinuous frames of images acquired from the video of the target scene, and the multiple frames of images that are acquired are renumbered for subsequent use. For example, the multiple frames of images acquired from the video of the target scene are sequentially recorded as images to be processed 1, 2, . . . , and n, n being an integer greater than 1. However, no limits are made thereto in the disclosure.

In the present example, the video of the target scene is a video shot in real time by a camera in a distance category. However, no limits are made thereto in the disclosure. For example, the video of the target scene may be a pre-recorded video of the distance category.

In Step 302, a first-type object and a second-type object are detected in any frame of image to be processed.

In the present step, any frame of image to be processed may be detected using a target detection model obtained based on a Yolov3 network to detect one or more first-type objects (i.e., human bodies in the present example) and one or more second-type objects (i.e., the desk, book, and pen in the present example).

In the present example, the Yolov3 network may be trained using a training set of the distance category scene (for example, network-opened category pictures, in a number of about 200) and target objects (including the human body, the desk, the book, and the pen) defined in the present scene and required to be detected to obtain the target detection model applicable to the distance category scene of the present example. Herein, the target detection model may include 53 Fully Connected (FC) convolutional layers, and may divide a whole input image to be processed into S×S regions and detect the regions with objects to detect the target objects, S being a positive integer. However, no limits are made thereto in the disclosure. In some examples, those of skilled in the art may simply replace the Yolov3 network to replace the Yolov3 network with another neural network algorithm, for example, a Yolov2 network.

In the present example, an input of the target detection model is a frame of image to be processed, and an output may include position information of a detection box of each first-type object (human body) in the frame of image to be processed, a corresponding confidence, position information of a detection box of each second-type object (the desk, the book, and the pen), and a corresponding confidence.

Figure 4:
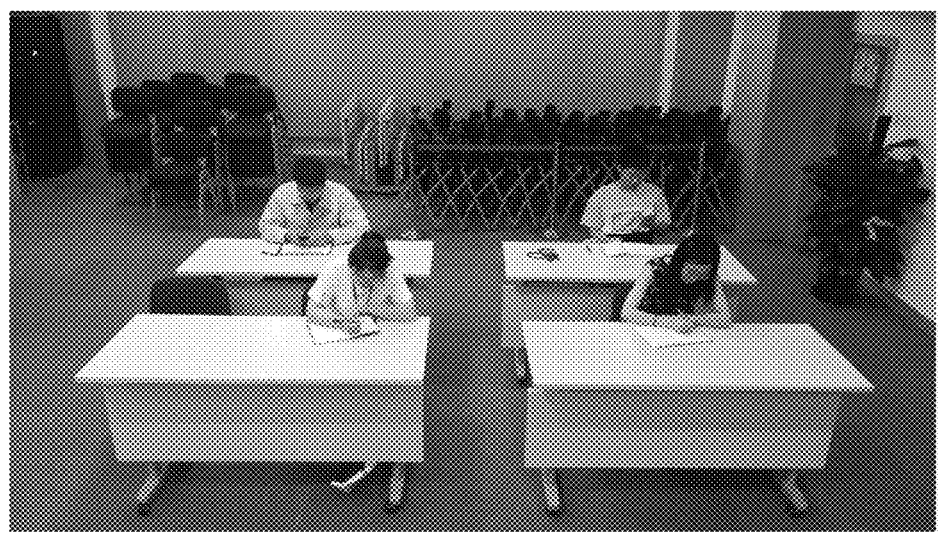
FIG. 4 is an example diagram of an image to be processed input to a target detection model according to at least one embodiment of the disclosure.
Figure 5:
FIG. 5 is a visual example diagram of a detection result of a target detection model according to at least one embodiment of the disclosure.

FIG. 4 is an example diagram of an image to be processed input to a target detection model according to at least one embodiment of the disclosure. FIG. 5 is a visual example diagram of a detection result of a target detection model according to at least one embodiment of the disclosure. In the present example, the detection box marked by the solid line in FIG. 5 is a detection box of a first-type object (human body), and is used to indicate a position of the first-type object, and the detection box marked by the dashed line is a detection box of a second-type object (the desk, the book, and the pen), and is used to indicate a position of the second-type object. However, no limits are made thereto in the disclosure. In some examples, only data of a detection result may be output, and a visual detection result is not required to be displayed.

In Step 303, key point information of any first-type object is determined.

Figure 6:
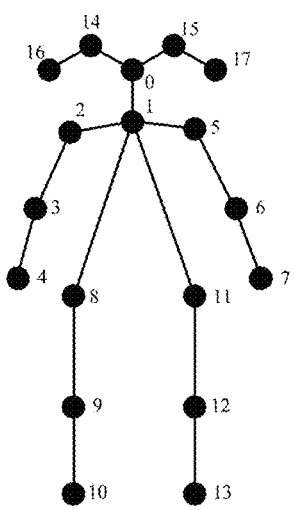
FIG. 6 is a schematic diagram of 18 joint points of a human body.

In the present example, the first-type object is a human body, and a key point of the first-type object may include 18 joint points of the human body. FIG. 6 is a schematic diagram of 18 joint points of a human body. Herein, the 18 joint points of the human body include the nose, the neck, the right shoulder, the right elbow, the right wrist, the left shoulder, the left elbow, the left wrist, the right hip, the right knee, the right ankle, the left hip, the left knee, the left ankle, the right eye, the left eye, the right ear, and the left ear. In the present example, there are 18 categories of the joint points. As shown in FIG. 6, the categories of the joint points may be distinguished through signs of the joint points. For example, the nose is denoted by joint point 0, the neck is denoted by joint point 1, the right shoulder is denoted by joint point 2, the right elbow is denoted by joint point 3, the right wrist is denoted by joint point 4, the left shoulder is denoted by joint point 5, the left elbow is denoted by joint point 6, the left wrist is denoted by joint point 7, the right hip is denoted by joint point 8, the right knee is denoted by joint point 9, the right ankle is denoted by joint point 10, the left hip is denoted by joint point 11, the left knee is denoted by joint point 12, the left ankle is denoted by joint point 13, the right eye is denoted by joint point 14, the left eye is denoted by joint point 14, the right ear is denoted by joint point 16, and the left ear is denoted by joint point 17.

In the present example, the key point information of each first-type object may include coordinate information of the 18 joint points of the human body and a corresponding confidence. Herein, the coordinate information of a joint point may include a two-dimensional coordinate value of the joint point in the image to be processed (namely an abscissa value and ordinate value of the joint point of the human body in a coordinate system defined in the image to be processed). Here, coordinate systems defined in different frames of images to be processed are the same. For example, in the coordinate system defined in the image to be processed, a top left corner of the image is taken as a coordinate origin, a horizontal direction is an abscissa direction, and a vertical direction is an ordinate direction. However, no limits are made thereto in the disclosure.

In the present example, the key point information of any first-type object in any frame of image to be processed may be determined using a key point detection model obtained based on an RMPE framework. Herein, the key point detection model takes a detection box of the first-type object detected by the target detection model as an input, and outputs the key point information of the first-type object.

Figure 7:
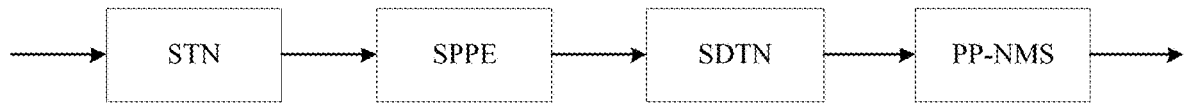
FIG. 7 is a structural example diagram of a key point detection model according to at least one embodiment of the disclosure.

FIG. 7 is a structural example diagram of a key point detection model according to at least one embodiment of the disclosure. As shown in FIG. 7, the key point detection model of the present example includes a Spatial Transformer Network (STN), a Single Person Pose Estimation (SPPE) network, a Spatial De-Transformer Network (SDTN), and a Parametric Pose Non-Maximum Suppression (PP-NMS).

In the present example, the STN is arranged to process the detection box of the first-type object (human body), the SPPE network is arranged to perform single person pose estimation, the STDN is arranged to generate a pose proposal, and the PP-NMS is arranged to remove a redundant pose. Herein, a parallel SPPE network may be adopted for additional regularization of a training stage. An enhanced image generated by a Pose-Guided Proposals Generator (PGPG) is used to train the STN, the SPPE, and the SDTN.

In the present example, since there are dense human bodies in the category scene, the SPPE network may be implemented using ResNet50, to reduce network response time.

Figure 8:
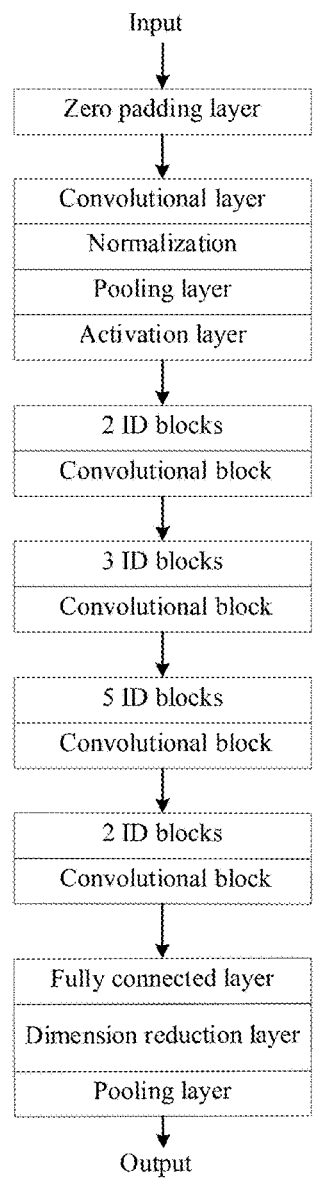
FIG. 8 is a structural example diagram of a Single Person Pose Estimation (SPPE) network in FIG. 7.

FIG. 8 is a structural example diagram of an SPPE block in FIG. 7. As shown in FIG. 8, the SPPE network of the present example includes a zero padding layer (Zero Pad), a first-stage network, a second-stage network, a third-stage network, a fourth-stage network, a fifth-stage network, a pooling layer (Average Pool), a dimension reduction (Flatten) layer, and a Fully Connected (FC) layer. Herein, the first-stage network includes a convolutional layer, a batch normalization layer (Batch Normalization), an activation layer, and a pooling layer (Max Pool). The second-stage network includes a convolutional block and two Identity (ID) blocks. The third-stage network includes a convolutional block and three ID blocks. The fourth-stage network includes a convolutional block and five ID blocks. The fifth-stage network includes a convolutional block and two ID blocks.

Figure 9:
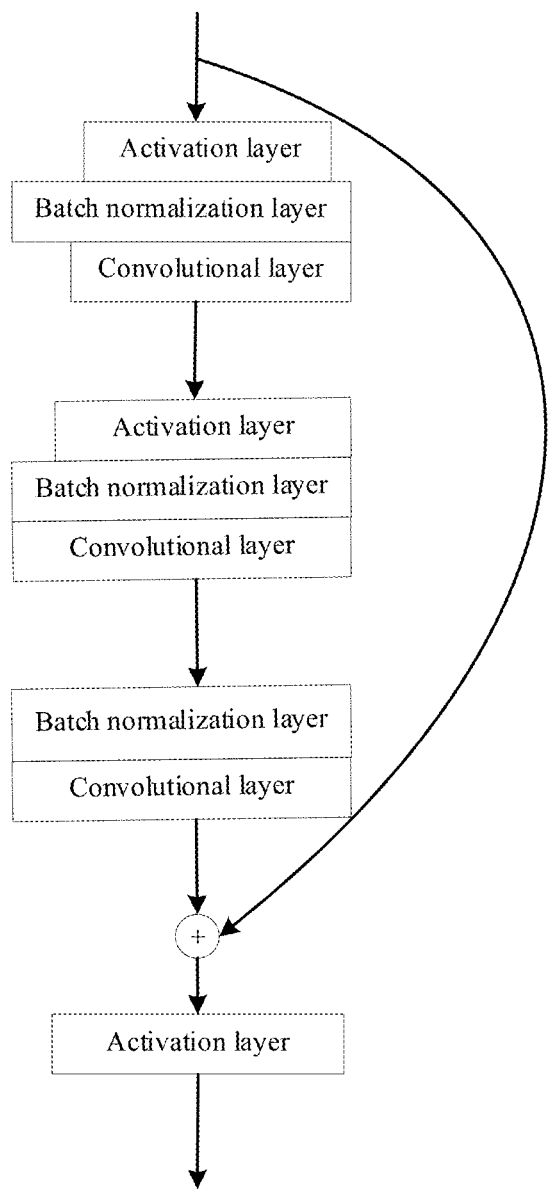
FIG. 9 is a structural example diagram of an Identity (ID) block in FIG. 8.

FIG. 9 is a structural example diagram of an ID block in FIG. 8. As shown in FIG. 9, an ID block includes three convolutional layers, three batch normalization layers, and three activation layers, and any batch normalization layer is located between a convolutional layer and an activation layer. Herein, an input of the ID block and outputs of the three batch normalization layers are added and input to the last activation layer.

Figures 10, 11:
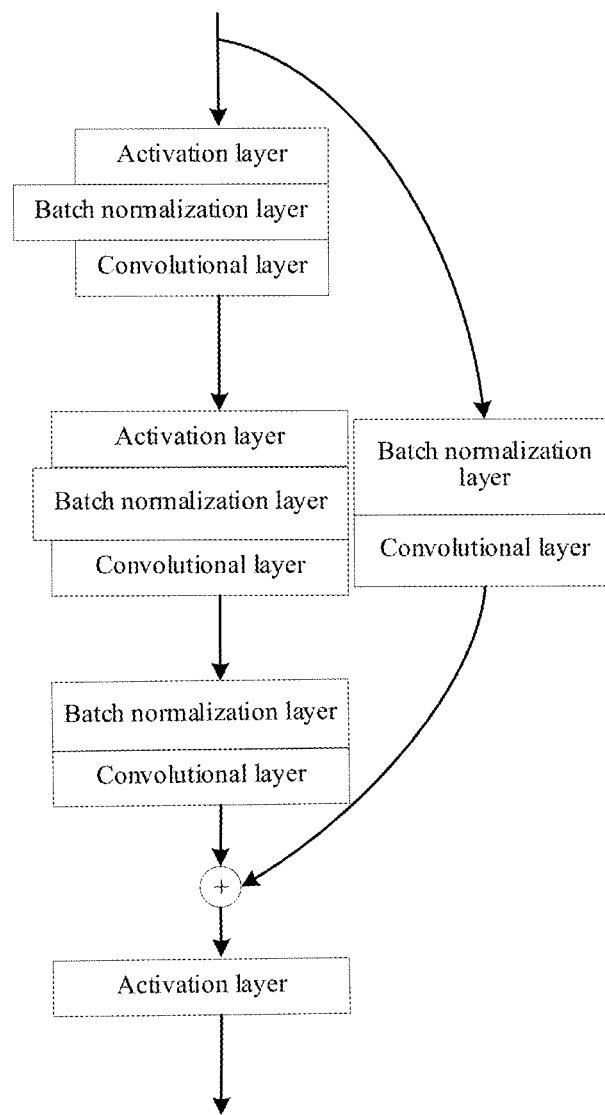
FIG. 10 is a structural example diagram of a convolutional block in FIG. 8.
FIG. 11 is a flowchart of an information display method according to at least one embodiment of the disclosure.

FIG. 10 is a structural example diagram of a convolutional block in FIG. 8. As shown in FIG. 10, a convolutional block includes fourth convolutional layers, four batch normalization layers, and three activation layers, and any batch normalization layer is located between a convolutional layer and an activation layer. Herein, an output obtained after an input of the convolutional block is processed through a convolutional layer and a batch normalization layer and an output obtained after the input of the convolutional block is processed through three convolutional layers, three batch normalization layers, and two activation layers are added and input to the last activation layer.

In the present example, the convolutional layer refers to a neuron layer that performs convolution processing on an input signal in the convolutional neural network. In the convolutional layer of the convolutional neural network, a neuron is only connected with part of neurons of an adjacent layer. The convolutional layer may apply a plurality of convolution kernels to an input image to extract multiple types of features of the input image. Each convolution kernel may extract a type of features. The convolution kernel is usually initialized in form of a matrix with a random size. In a training process of the convolutional neural network, the convolution kernel obtains a reasonable weight by learning. In the same convolutional layer, multiple convolution kernels may be used to extract different image information.

In the present example, the activation layer may include an activation function, and the activation function is arranged to introduce a nonlinear factor to the convolutional neural network such that relatively complex problems may be solved better through the convolutional neural network. The activation function may include a Rectified Linear Unit (ReLU) function, an S function (Sigmoid function), a hyperbolic tangent function (tanh function), or the like. The ReLU function is an unsaturated nonlinear function, and the Sigmoid function and the tanh function are saturated nonlinear functions.

In the present example, the batch normalization layer is arranged to normalize each batch of data, and has the advantages of accelerating training, preventing overfitting, etc.

In the present example, descriptions are made taking merging of three frames of images to be processed (for example, an image to be processed during present processing is an nth frame, namely a present image is the nth frame of image to be processed, and a reference image group includes an (n−1)th frame of image to be processed and an (n−2)th frame of image to be processed) as an example. However, no limits are made thereto in the disclosure.

In Step 304, a matching relationship of any first-type object in an nth frame of image to be processed and multiple first-type objects in (n−1)th and (n−2)th frames of images to be processed is determined according to key point information of each first-type object in the nth frame of image to be processed and the two frames of images to be processed (i.e., the (n−1)th frame of image to be processed and the (n−2)th frame of image to be processed) before the nth frame of image to be processed.

In the present example, the key point information of each first-type object (human body) in each frame of image to be processed may be obtained through Step 303. Herein, the key point information of each first-type object includes the coordinate information (including the abscissa value and ordinate value in the coordinate system defined in the image to be processed) of 18 key points (i.e., the 18 joint points of the human body) and the corresponding confidences.

In the present step, a matching relationship of multiple first-type objects in any two adjacent frames of images to be processed in the three frames of images to be processed (the nth frame, (n−1)th frame, and (n−2)th frames of images to be processed) is determined at first, and then a matching relationship of the multiple first-type objects in the three frames of images to be processed is determined. In other words, the matching relationship between any first-type object in the nth frame of image to be processed and any first-type object in the (n−1)th frame of image to be processed and the matching relationship between any first-type object in the (n−1)th frame of image to be processed and any first-type object in the (n−2)th frame of image to be processed are determined respectively, and then the matching relationship of the multiple first-type objects in the three frames of images to be processed is obtained by merging.

Descriptions will be made below taking a determination process of the matching relationship between any first-type object in the nth frame of image to be processed and any first-type object in the (n−1)th frame of image to be processed as an example. In the present example, the determination process of the matching relationship between any first-type object in the nth frame of image to be processed and any first-type object in the (n−2)th frame of image to be processed includes that: an exponential 2-norm distance between key points of the same category of any first-type object (human body) in the nth frame of image to be processed and any first-type object (human body) in the (n−1)th frame of image to be processed is calculated; a correlation between the first-type object in the nth frame of image to be processed and the first-type object in the (n−1)th frame of image to be processed is determined according to the number of key points of which exponential 2-norm distances satisfy a third condition; and a matching relationship of multiple first-type objects in the nth and (n−1)th frames of images to be processed is determined using a Hungarian algorithm according to the correlation between any two first-type objects in the nth and (n−1)th frames of images to be processed.

For example, five human bodies (for example, recorded as human body a0, human body a1, human body a2, human body a3, and human body a4 respectively) are detected in the nth frame of image to be processed, and six human bodies (for example, recorded as human body b0, human body b1, human body b2, human body b3, human body b4, and human body b5 respectively) are detected in the (n−1)th frame of image to be processed. Taking calculation of a correlation between human body a0 in the nth frame of image to be processed and human body b0 in the (n−1)th frame of image to be processed as an example, an exponential 2-norm distance between joint point 0 of human body a0 and joint point 0 of human body b0 is calculated according to the following formula:

$$e^{\frac{-\sum(p_2^i - p_1^i)^2}{2(S_1 + S_2) \times (2\sigma)^2}},$$

where $p_1^i$ is a coordinate value in the ith dimension of joint point 0 of human body a0 in the nth frame of image to be processed, $p_2^i$ is a coordinate value in the ith dimension of joint point 0 of human body b0 in the (n−1)th frame of image to be processed, and i is valued to 1 and 2. For example, a coordinate value in the first dimension may be the abscissa value, and a coordinate value in the second dimension may be the ordinate value. $S_1$ is an area of a detection box of human body a0 in the nth frame of image to be processed, $S_2$ is an area of a detection box of human body b0 in the (n−1)th frame of image to be processed, and σ is a correction coefficient for joint point 0 (i.e., the nose).

In the present example, for joint points 0 to 17, values of corresponding correction coefficients may sequentially be 0.026, 0.079, 0.079, 0.072, 0.062, 0.079, 0.072, 0.062, 0.107, 0.087, 0.089, 0.107, 0.087, 0.089, 0.025, 0.025, 0.035, and 0.035. However, no limits are made thereto in the disclosure.

In the present example, when the exponential 2-norm distance between joint point 0 of human body a0 and joint point 0 of human body b0 satisfies the third condition (for example, less than a first threshold), a dissimilar point number between human body a0 and human body b0 is increased by 1. Herein, the first threshold is, for example, 0.5. By parity of reasoning, an exponential 2-norm distance between joint point 1 of human body a0 and joint point 1 of human body b0 and an exponential 2-norm distance between joint point 2 of human body a0 and joint point 2 of human body b0 are also required to be calculated until an exponential 2-norm distance between joint point 17 of human body a0 and joint point 17 of human body b0 is calculated.

In the present example, the dissimilar point number between human body a0 and human body b0 may be obtained according to respective comparison results of the exponential 2-norm distances between the 18 joint points of human body a0 and the 18 joint points of human body b0 and the first threshold. In the present example, the dissimilar point number represents the correlation between the two human bodies. However, no limits are made thereto in the disclosure. For example, a similar point number may be adopted to represent the correlation between the two human bodies.

In the present example, correlation results between the human bodies in the nth frame of image to be processed and the human bodies in the (n−1)th frame of image may be shown in Table 1.

TABLE 1

|  | Human body b0 | Human body b1 | Human body b2 | Human body b3 | Human body b4 | Human body b5 |
|---|---|---|---|---|---|---|
| Human body a0 | 18 | 18 | 7 | 18 | 18 | 18 |
| Human body a1 | 18 | 4 | 18 | 10 | 0 | 15 |
| Human body a2 | 18 | 0 | 5 | 18 | 0 | 0 |
| Human body a3 | 18 | 18 | 18 | 18 | 2 | 18 |
| Human body a4 | 0 | 18 | 18 | 18 | 18 | 18 |

In the present example, after correlations, shown in Table 1, between the multiple human bodies in the nth frame of image to be processed and the (n−1)th frame of image are obtained, a matching relationship of the five human bodies (i.e., human bodies a0 to a4) in the nth frame of image to be processed and the six human bodies (i.e., human bodies b0 to b5) in the (n−1)th frame of image to be processed may be determined using the Hungarian algorithm (Kuhm-Munkres (KM)).

In the present example, a matching problem of the human bodies in the nth frame of image to be processed and the (n−1)th frame of image to be processed is modeled into a problem of solving a best match of a bipartite graph, and the Hungarian algorithm may be used for the best matching problem of the bipartite graph. Herein, the matching problem is modeled into the bipartite graph G=(X, Y, E), where X and Y may correspond to human body sets in the nth and (n−1)th frames of images to be processed respectively. For example, X=<a0, a1, a2, a3, a4>, Y=<b0, b1, b2, b3, b4, b5>. Edge set E may be constructed according to the following rule: if a similarity between any element in X and any element in Y is greater than a threshold, two corresponding vertexes (corresponding to an element in X and an element in Y) in the bipartite graph G are connected to form an edge, and a weight w of the edge is set to the similarity between the two elements. In the present example, the similarity between the elements may be obtained according to the dissimilar point number in Table 1.

Through the abovementioned bipartite graph model, the matching problem between human bodies in two frames of images to be processed may be converted into the matching problem of vertexes X to Y in the bipartite graph G. Herein, the bipartite graph G is given, and in a subgraph M of G, if any two edges in an edge set of M are independent of the same vertex, M is called a match. Selecting a subset with most such edges is called the best matching problem of the graph. The best matching problem of the bipartite graph is solved through the KM algorithm. The KM algorithm is a classical algorithm for solving a best match of a bipartite graph.

In the present example, the matching relationship of the human bodies in the nth frame of image to be processed and the human bodies in the (n−1)th frame of image may be shown in Table 2.

TABLE 2

| Human body a0 | Human body b2 |
| Human body a1 | Human body b1 |
| Human body a2 | Human body b0 |
| Human body a3 | Human body b4 |
| Human body a4 | Human body b5 |

It can be seen from Table 2 that there is no matched human body in the nth frame of image to be processed for human body b3 in the (n−1)th frame of image to be processed, and it indicates that human body b3 may already be out of the distance category.

In the present example, referring to the abovementioned processing process, the matching relationship of the human bodies in the (n−1)th frame of image to be processed and human bodies (for example, recorded as human body c0, human body c1, human body c2, human body c3, human body c4, and human body c5 respectively) may also be obtained. Then, the human bodies in the (n−1)th frame of image to be processed are associated with the human bodies in the (n−2)th frame of image to be processed, thereby obtaining the matching relationship of the human bodies in the nth, (n−1)th, and (n−2)th frames of images to be processed. For example, human body a0 in the nth frame of image to be processed may be matched with the following human bodies: human body c0 in the (n−1)th frame of image to be processed and human body b1 in the (n−1)th frame of image to be processed.

In Step 305, key point merging information of any first-type object in the nth frame of image to be processed is obtained according to the matching relationship of the multiple first-type objects in the three frames of images to be processed.

In the present example, the key point merging information of any first-type object includes the coordinate information of the 18 joint points of the human body and the corresponding confidences.

In the present step, taking matching of human body a0 in the nth frame of image to be processed, human body b2 in the (n−1)th frame of image to be processed, and human body c0 in the (n−2)th frame of image to be processed as an example, since key point information of human body a0, key point information of human body b2, and key point information of human body c0 include coordinate information of 18 categories of joint points and confidences respectively, for the joint points of each category, the coordinate information corresponding to the highest confidence is extracted from the key point information of the three human bodies as merged coordinate information of the joint point of this category of human body a0 in the nth frame of image to be processed. For example, for joint point 0, coordinate information of joint point 0 and the confidences are extracted from the key point information of human body a0, the key point information of human body b2, and the key point information of human body c0, and the highest confidence and the corresponding coordinate information are selected as the coordinate information and confidence of joint point 0 in the key point merging information of human body a0.

In Step 306, a behavior analysis result of any first-type object in the nth frame of image to be processed is determined according to the key point merging information of the first-type object and position information of one or more second-type objects in the nth frame of image to be processed.

In the present step, when the number of key points of which confidences satisfy a first condition (for example, greater than 0.5) in the key point merging information of any first-type object in the nth frame of image to be processed satisfies a second condition (for example, greater than 3), the behavior analysis result of the first-type object is determined according to the key point merging information of the first-type object, the position information of the second-type object in the nth frame of image to be processed, and a second preset position rule.

In some examples, the number of key points of which confidences are greater than 0.5 in the key point merging information of human body a0 in the nth frame of image to be processed is greater than three, and then a behavior analysis result of human body a0 is determined according to the key point merging information of human body a0 and position information of the desk, book, and pen in the nth frame of image to be processed and according to the second preset position rule.

For example, the second preset position rule may include recognizing behaviors of a human body according to the following sequence.

(1) Raising the hand: when the number of joint points of which confidences are greater than 0.02 in joint points (as shown in FIG. 6, including joint point 0, joint point 14, joint point 15, joint point 16, and joint point 17) in a head region is greater than three, a position of the right wrist is higher than a position of the right elbow and the position of the right elbow is higher than a position of the right shoulder, or, the position of the right wrist is higher than the position of the right shoulder and an included angle of a connecting line between the right wrist and the right elbow and a connecting line between the right wrist and the right shoulder satisfies a certain angle threshold (for example, close to 90 degrees).

(2) Standing: a length of an upper part of the human body or a shoulder breadth is greater than standing threshold. Herein, the length of the upper part of the human body may be obtained according to coordinate information of the joint points in the head region and the joint points in an upper body region, and the shoulder breadth may be obtained according to coordinate information of the joint points of the left shoulder and the right shoulder. The standing threshold is correlated with a video shooting angle.

(3) Bending over the desk: a lowest point of the head is a middle-lower position of the upper body, and the lowest point of the head is on a desktop. Herein, the lowest point of the head may be determined according to the coordinate information of the joint points in the head region, a middle position of the upper body may be determined according to the coordinate information of the joint points in the upper body region, and a position of the desktop is determined according to the position information of the detected desk.

(4) Writing: the head is lowered, there is the pen in front, and the pen is at hand. Here, a pose of the head may be determined according to the coordinate information of the joint points in the head region, a position of a hand may be determined according to coordinate information of the joint points in a hand region, and a position of the pen may be determined according to the position information of the detected pen.

(5) Reading: the head is lowered, and there is the book in front. Herein, the pose of the head may be determined according to the coordinate information of the joint points in the head region, and a position of the book may be determined according to the position information of the detected book.

(6) Sitting: it is a default state. In other words, if it is not recognized that the human body is not performing any one of the above five behaviors, it is determined that the human body is in a sitting state.

In the present example, the abovementioned six behaviors may be recognized according to the second preset position rule. However, the abovementioned second preset position rule is only an example, and no limits are made thereto in the disclosure. In some examples, a position rule may be set according to a practical pose to improve the behavior recognition accuracy.

In the present example, in the present step, the behavior analysis result of any first-type object in the nth frame of image to be processed may also be determined only according to the key point merging information of the first-type object in the nth frame of image to be processed. In some examples, when the number of the key points of which the confidences satisfy the first condition in the key point merging information of any first-type object in the nth frame of image to be processed satisfies the second condition, the behavior analysis result of the first-type object is determined according to the key point merging information of the first-type object and a first preset position rule. Herein, the first preset position rule may be set according to a practical application, and no limits are made thereto in the disclosure.

In Step 307, behavior analysis results of all first-type objects in the nth frame of image to be processed are statistically analyzed to obtain a behavior analysis result of the target scene.

In the present example, when the number of the first-type objects in the nth frame of image to be processed is multiple, after the behavior analysis result of each first-type object is determined through Step 306, the behavior analysis result of the target scene may be statistically obtained.

For example, after data statistics is made to the target scene, the data may be encapsulated into a JSON format according to a format defined with a front-end display interface. For example, the data is encapsulated in the following formula:

```
{
  'class': 'class B1201',
    'basic data': {'the number of online students': 19, 'course information': 'click to view', 'rank
statistics': 'click to view', 'class home page': 'click to view'},
    'behavior statistical curve': {'sit': '6', 'bend over the desk': '2', 'raise the hand': '1', 'stand': '2',
'read': '5', 'write': '3'},
    'action': {'sit': '31.6%', 'bend over the desk': '10.5%', 'raise the hand': '5.3%', 'stand':
'10.5%', 'read': '26.3', 'write': '15.8%'}
  }.
```

In the present example, the behavior analysis result of the target scene may include the total number of persons of multiple types of behaviors in the target scene and a ratio of the number of persons corresponding to each type of behaviors to the total number of the persons in the target scene. The data in the abovementioned example is only an example, and no limits are made thereto in the disclosure.

In another implementation mode, expression analysis may further be performed based on the nth frame of image to be processed to obtain an expression analysis result. As such, when the data is encapsulated, a comprehensive analysis result including an expression and a behavior may be obtained. However, no limits are made thereto in the disclosure.

In the example shown in FIG. 2, the electronic device 202 arranged to perform object behavior analysis may upload the abovementioned encapsulated data to the second server 204, and the second server 204 provides the encapsulated data for the display terminal 205 such that the display terminal 205 converts the encapsulated data into a visual result such as a display icon or a curve.

According to the object behavior analysis method provided in the embodiment of the disclosure, the behavior of the student in the distance category may be analyzed accurately in real time, thereby helping to analyze the teaching effect of the teacher, the point of interest, boring point, and difficulty in the course, the initiative of the student, and other aspects, and more detailed and personalized service may be provided for teachers and schools.

FIG. 11 is a flowchart of an information display method according to at least one embodiment of the disclosure. As shown in FIG. 11, the information display method provided in the present embodiment includes the following steps.

In Step 311, a video of a target scene and a behavior analysis result corresponding to the video are acquired respectively. Herein, the behavior analysis result may be obtained by the abovementioned object behavior analysis method.

In Step 312, the video and the corresponding behavior analysis result are displayed on a display interface.

In some exemplary implementation modes, the behavior analysis result corresponding to the video may include at least one of: behavior analysis results of all first-type objects in a present image that is played in real time in the video, the total number of first-type objects of each type of behaviors in the present image, and a ratio of the total number of the first-type objects of each type of behaviors in the present image to the total number of the first-type objects in the present image.

In some exemplary implementation modes, Step 311 may include that: the video of the target scene is acquired from a first server, and the behavior analysis result corresponding to the video is acquired from a second server. In some examples, the information display method provided in the present embodiment may be executed by a display terminal 205 in the example shown in FIG. 2. Herein, the display terminal 205 may acquire the video of the target scene from the first server 203, acquire the behavior analysis result corresponding to the video from the second server 204, and then display the received video and corresponding behavior analysis result on the display interface. However, no limits are made thereto in the disclosure. For example, in another implementation mode, object behavior analysis processing and information display are completed by an electronic device.

In some exemplary implementation modes, Step 312 may include that: the video is displayed in a first region of the display interface, and the behavior analysis result is displayed in a second region of a display region through at least one manner of a graph and a table. Herein, the first region and the second region may be a left half region and right half region of the display interface, or, an upper half region and a lower half region, or a central region and a peripheral region. However, no limits are made thereto in the disclosure.

In the present embodiment, the video and the behavior analysis result are displayed synchronously to help to know about a condition of the target scene, thereby improving user experiences.

Figure 12:
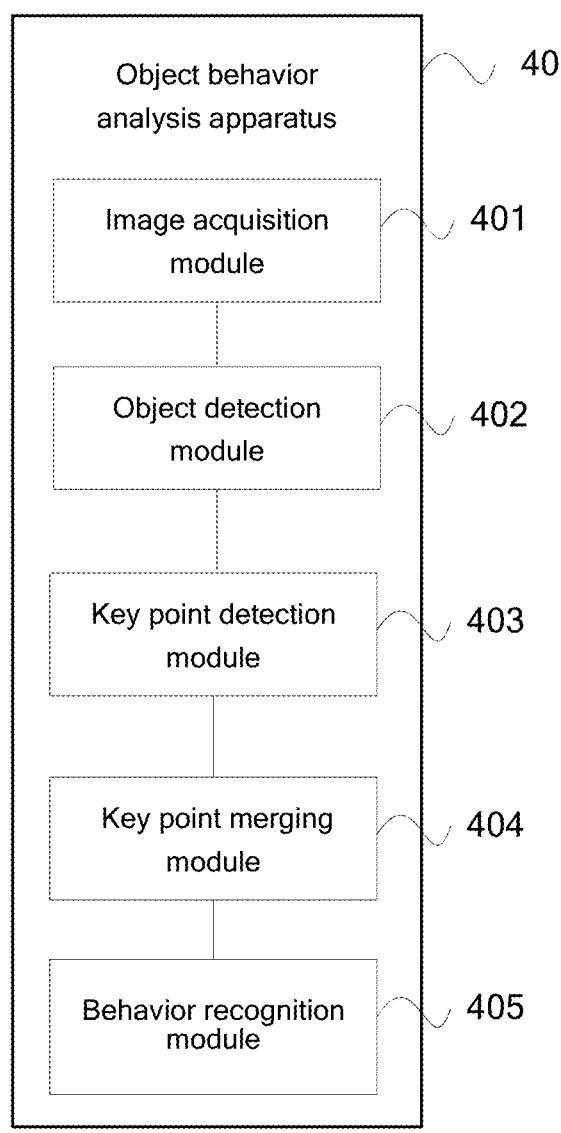
FIG. 12 is a schematic diagram of an object behavior analysis device according to at least one embodiment of the disclosure.

FIG. 12 is a schematic diagram of an object behavior analysis device according to at least one embodiment of the disclosure. As shown in FIG. 12, the object behavior analysis apparatus 40 provided in the present embodiment includes: an image acquisition module 401, an object detection module 402, a key point detection module 403, a key point merging module 404, and a behavior recognition module 405 The image acquisition module 401 is arranged to acquire multiple frames of images to be processed from a video of a target scene. The object detection module 402 is arranged to detect at least one first-type object in any frame of image to be processed. The key point detection module 403 is arranged to determine key point information of any first-type object. The key point merging module 404 is arranged to determine key point merging information of any first-type object in a present image according to key point information of the first-type objects in the present image and a reference image group, the present image being any frame of image to be processed during present processing, and the reference image group including at least one frame of image to be processed before the present image. The behavior recognition module 405 is arranged to determine a behavior analysis result of any first-type object in the present image according to the key point merging information of the first-type object in the present image.

The components and structure of the object behavior analysis apparatus shown in FIG. 12 are only exemplary and unrestrictive. The object behavior analysis apparatus may also include other components and structure as required.

Detailed descriptions about the object behavior analysis apparatus provided in the present embodiment may refer to the related descriptions about the abovementioned object behavior analysis method, and thus elaborations are omitted herein.

Figure 13:
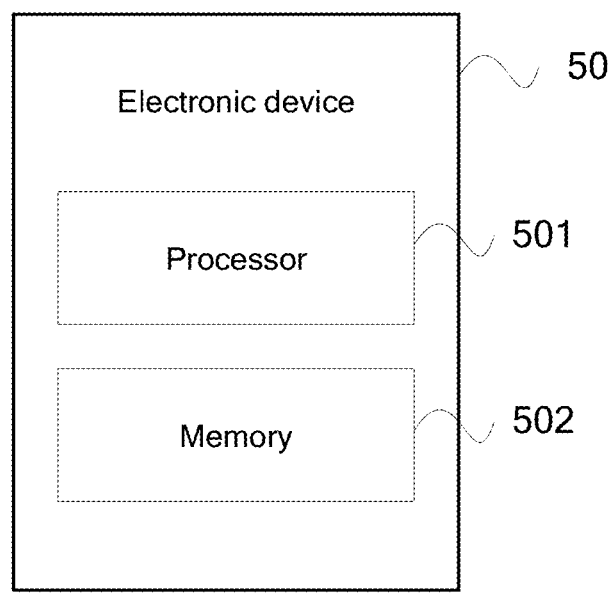
FIG. 13 is a schematic diagram of an electronic device according to at least one embodiment of the disclosure.

FIG. 13 is a schematic diagram of an electronic device according to at least one embodiment of the disclosure. As shown in FIG. 13, the electronic device 50 includes a processor 501 and a memory 502. The components of the electronic device 50 shown in FIG. 13 are only exemplary and unrestrictive. The electronic device 50 may also include other components as required by a practical application. For example, the processor 501 communicates with the memory 502 directly or indirectly.

For example, components such as the processor 501 and the memory 502 may be connected a network for communication. The network may include a wireless network, a wired network, or, any combination of the wired network and the wireless network. The network may include a local area network, the Internet, a telecommunication network, an Internet-based Internet of things, a telecommunication-network-based Internet of things, and any combination of the above networks. The wired network may adopt a transmission manner such as a twisted pair, a coaxial cable, or an optical fiber for communication. The wireless network may adopt a communication manner such as a 3rd-Generation (3G), 4th-Generation (4G), and 5th-Generation (5G) mobile communication networks, Bluetooth, or Wireless Fidelity (WIFI). A type and function of the network are not limited in the disclosure.

For example, the processor 501 may control the other components in the electronic device to execute desired functions. The processor 501 may be a device with a data processing capability or a program execution capability, such as a Central Processing Unit (CPU), a Tensor Processing Unit (TPU), or a Graphics Processing Unit (GPU). The GPU may be independently directly integrated to a main board or embedded in a north bridge chip of the main board. The GPU may also be embedded in the CPU.

For example, the memory 502 may include one or any combination of multiple computer program products. The computer program product may include at least one form of computer-readable storage medium, for example, a volatile memory and a nonvolatile memory. The volatile memory may include, for example, a Random Access Memory (RAM) and a cache. The nonvolatile memory may include, for example, a Read Only Memory (ROM), a hard disk, an Erasable Programmable Read Only Memory (EPROM), a Compact Disc Read Only Memory (CD-ROM), a Universal Serial Bus (USB) memory, and a flash memory. There may also be stored in the computer-readable storage medium at least one application program and at least one type of data, for example, an input image, and at least one type of data used or generated by the application program.

For example, there may be stored in the memory 502 one or more computer-readable codes or program instructions, and the processor may run the program instruction to execute the abovementioned object behavior analysis method. Detailed descriptions about the object behavior analysis method may refer to the related descriptions in the method of the abovementioned object behavior analysis method, and thus elaborations are omitted herein.

At least one embodiment of the disclosure also provides a computer-readable storage medium, which stores a program instruction. When the program instruction is executed, the abovementioned object behavior analysis method may be implemented.

It can be understood by those of ordinary skill in the art that all or some steps in the method disclosed above and function modules/units in the system and the apparatus may be implemented as software, firmware, hardware, and proper combinations thereof. In a hardware implementation mode, division of the function modules/units mentioned in the above description is not always division corresponding to physical components. For example, a physical component may have multiple functions, or a plurality of physical components may cooperate to execute a function or step. Some components or all components may be implemented as software executed by a processor such as a digital signal processor or a microprocessor, or implemented as hardware, or implemented as integrated circuits such as application specific integrated circuits. Such software may be distributed in a computer-readable medium, and the computer-readable medium may include a computer storage medium (or a non-transitory medium) and a communication medium (or a temporary medium). As known to those of ordinary skill in the art, term computer storage medium includes volatile/nonvolatile and removable/irremovable media implemented in any method or technology for storing information (for example, a computer-readable instruction, a data structure, a program module, or other data). The computer storage medium includes, but not limited to, a RAM, a ROM, an Electrically Erasable Programmable Read-Only Memory (EEPROM), a flash memory or other memory technologies, a CD-ROM, a Digital Video Disk (DVD) or other compact discs, a cassette, a magnetic tape, a disk memory or other magnetic storage devices, or any other medium configurable to store expected information and accessible for a computer. In addition, it is known to those of ordinary skill in the art that the communication medium usually includes a computer-readable instruction, a data structure, a program module or other data in a modulated data signal of, for example, a carrier or another transmission mechanism, and may include any information transmission medium.

Those of ordinary skill in the art should know that modifications or equivalent replacements may be made to the technical solutions of the embodiments of the disclosure without departing from the spirit and scope of the technical solutions of the disclosure, and shall all fall within the scope of the claims of the disclosure.

What is claimed is:
1. An object behavior analysis method, comprising:
acquiring multiple frames of images to be processed from a video of a target scene;
detecting at least one first-type object in any frame of image to be processed, and determining key point information of any first-type object;
determining key point merging information of any first-type object in a present image according to key point information of first-type objects in the present image and a reference image group, wherein the present image is any frame of image to be processed during present processing, and the reference image group comprises at least one frame of image to be processed before the present image; and
determining a behavior analysis result of any first-type object in the present image according to the key point merging information of the first-type object in the present image,
wherein determining the key point merging information of any first-type object in the present image according to the key point information of the first-type objects in the present image and the reference image group comprises:

for the present image and any two adjacent frames of images to be processed in the reference image group, determining a matching relationship of multiple first-type objects in the two adjacent frames of images to be processed according to key point information of each first-type object in the two adjacent frames of images to be processed;

determining a matching relationship between any first-type object in the present image and at least one first-type object in the reference image group according to the present image and the matching relationship of the multiple first-type objects in any two adjacent frames of images to be processed in the reference image group; and determining the key point merging information of any first-type object in the present image according to the matching relationship between the first-type object in the present image and the at least one first-type object in the reference image group and the key point information, wherein the key point merging information of the first-type object comprises coordinate information with a highest confidence corresponding to the key point of each category of the first-type object and the highest confidence corresponding to the coordinate information.

2. The object behavior analysis method according to claim 1, wherein determining the key point merging information of any first-type object in the present image according to the matching relationship between the first-type object in the present image and the at least one first-type object in the reference image group and the key point information comprises:

for any key point of any first-type object in the present image, extracting coordinate information, corresponding to the category that the key point belongs to, whose confidence is the highest, from key point information of the first-type object in the present image and key point information of a first-type object matched with the first-type object in the reference image group; and obtaining the key point merging information of the first-type object according to the highest confidence and the coordinate information corresponding to the key point of each category of the first-type object in the present image.

3. The object behavior analysis method according to claim 2, wherein determining the behavior analysis result of any first-type object in the present image according to the key point merging information of the first-type object in the present image comprises:

in the key point merging information of any first-type object in the present image, when the number of key points satisfies a second condition, and the confidence corresponding to the coordinate information of the key points satisfy a first condition, determining the behavior analysis result of the first-type object according to the key point merging information of the first-type object and a first preset position rule.

4. The object behavior analysis method according to claim 1, further comprising:

detecting at least one second-type object in any frame of image to be processed, and determining position information of any second-type object; and determining the behavior analysis result of any first-type object in the present image according to the key point merging information of the first-type object and position information of the at least one second-type object in the present image.

5. The object behavior analysis method according to claim 4, wherein determining the behavior analysis result of any first-type object in the present image according to the key point merging information of the first-type object and position information of the at least one second-type object in the present image comprises:

in the key point merging information of any first-type object in the present image, when the number of the key points satisfies a second condition, and the confidence corresponding to the coordinate information of the key points satisfy a first condition, determining the behavior analysis result of the first-type object according to the key point merging information of the first-type object, the position information of the second-type object in the present image, and a second preset position rule.

6. The object behavior analysis method according to claim 1, wherein determining the matching relationship of the multiple first-type objects in the two adjacent frames of images to be processed according to the key point information of each first-type object in the two adjacent frames of images to be processed comprises:

calculating an exponential 2-norm distance between key points with a same category of any first-type object in one frame of image to be processed and any first-type object in the other frame of image to be processed according to the key point information of each first-type object in the two adjacent frames of images to be processed;

determining a correlation between the two first-type objects in the two frames of images to be processed according to the number of key points of which exponential 2-norm distances satisfy a third condition; and determining the matching relationship of the multiple first-type objects in the two frames of images to be processed using a Hungarian algorithm according to the correlation between any two first-type objects in the two frames of images to be processed.

7. The object behavior analysis method according to claim 6, wherein the key point information of the first-type object comprises coordinate information of multiple key points of the first-type object, and the coordinate information comprises coordinate values of two dimensions, wherein calculating the exponential 2-norm distance between the key points of the same category of any first-type object in one frame of image to be processed and any first-type object in the other frame of image to be processed according to the key point information of each first-type object in the two adjacent frames of images to be processed comprises:

calculating the exponential 2-norm distance between the key points of the same category of any first-type object in one adjacent frame of image to be processed and any first-type object in the other frame of image to be processed through the following formula:

$$e^{\frac{-\sum(p_2^i - p_1^i)^2}{(S_1 + S_2) \times (2\sigma)^2}},$$

where $p_1^i$ is a coordinate value in an ith dimension of a key point of a first-type object in one frame of image to be processed, and $p_2^i$ is a coordinate value in the ith dimension of a key point of a first-type object in the other frame of image to be processed, categories of the two key points being the same; and $S_1$ is an area of a detection box of the first-type object in one frame of image to be processed, $S_2$ is an area of a detection box of the first-type object in the other frame of image to be processed, σ is a correction coefficient for key points of the category, and i is an integer greater than 0.

8. The object behavior analysis method according to claim 1, wherein the first-type object is a human body, and key points of the first-type object comprise multiple joint points of the human body.

9. The object behavior analysis method according to claim 1, further comprising: statistically analyzing behavior analysis results of all first-type objects in the present image to obtain a behavior analysis result of the target scene, wherein the behavior analysis result of the target scene comprises at least one of: the total number of first-type objects of each type of behaviors in the target scene and a ratio of the total number of the first-type objects of each type of behaviors to the total number of first-type objects in the target scene.

10. An information display method, comprising:
acquiring a video of a target scene and a behavior analysis result corresponding to the video respectively, wherein the behavior analysis result is obtained by the object behavior analysis method according to claim 1; and
displaying the video and the corresponding behavior analysis result on a display interface.

11. The information display method according to claim 10, wherein acquiring the video of the target scene and the behavior analysis result corresponding to the video respectively comprises: acquiring the video of the target scene from a first server; and acquiring the behavior analysis result corresponding to the video from a second server.

12. The information display method according to claim 10, wherein displaying the video and the corresponding behavior analysis result on the display interface comprises: displaying the video in a first region of the display interface, and displaying the behavior analysis result in a second region of the display interface through at least one manner of a graph and a table.

13. The information display method according to claim 10, wherein the behavior analysis result corresponding to the video comprises at least one of: behavior analysis results of all first-type objects in a present image that is played in the video, the total number of first-type objects of each type of behaviors in the present image, and a ratio of the total number of the first-type objects of each type of behaviors in the present image to the total number of the first-type objects in the present image.

14. An electronic device, comprising a memory and a processor, wherein the memory is arranged to store a program instruction, and when the processor executes the program instruction, the steps of the object behavior analysis method according to claim 1 are implemented.

15. A non-transitory computer-readable storage medium, storing a program instruction, wherein, when the program instruction is executed by a processor, the object behavior analysis method according to claim 1 are implemented.

16. The object behavior analysis method according to claim 2, wherein the first-type object is a human body, and key points of the first-type object comprise multiple joint points of the human body.

17. The object behavior analysis method according to claim 2, further comprising: statistically analyzing behavior analysis results of all first-type objects in the present image to obtain a behavior analysis result of the target scene, wherein the behavior analysis result of the target scene comprises at least one of: the total number of first-type objects of each type of behaviors in the target scene and a ratio of the total number of the first-type objects of each type of behaviors to the total number of first-type objects in the target scene.

* * * * *